(12) United States Patent
Gao

(10) Patent No.: US 10,783,364 B2
(45) Date of Patent: Sep. 22, 2020

(54) METHOD, APPARATUS AND DEVICE FOR WAKING UP VOICE INTERACTION FUNCTION BASED ON GESTURE, AND COMPUTER READABLE MEDIUM

(71) Applicant: Beijing Baidu Netcom Science and Technology Co., Ltd., Beijing (CN)

(72) Inventor: Liang Gao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 86 days.

(21) Appl. No.: 16/165,761

(22) Filed: Oct. 19, 2018

(65) Prior Publication Data

US 2019/0228217 A1 Jul. 25, 2019

(30) Foreign Application Priority Data

Jan. 22, 2018 (CN) .......................... 2018 1 0061028

(51) Int. Cl.
 *G06K 9/00* (2006.01)
 *G10L 15/24* (2013.01)
 *G10L 15/22* (2006.01)
 *G06F 3/01* (2006.01)

(52) U.S. Cl.
 CPC ......... *G06K 9/00355* (2013.01); *G06F 3/017* (2013.01); *G06K 9/00389* (2013.01); *G10L 15/22* (2013.01); *G10L 15/24* (2013.01)

(58) Field of Classification Search
 CPC .......................... G06F 3/017; G06K 9/00355; G06K 9/00389; G10L 15/25
 See application file for complete search history.

(56) References Cited

U.S. PATENT DOCUMENTS

| 8,854,433 | B1* | 10/2014 | Rafii | G06F 3/017 |
| | | | | 348/42 |
| 2014/0059365 | A1* | 2/2014 | Heo | G06F 1/1694 |
| | | | | 713/320 |
| 2016/0011851 | A1* | 1/2016 | Zhang | H04R 3/12 |
| | | | | 715/716 |

FOREIGN PATENT DOCUMENTS

| CN | 104423551 A | 3/2015 |
| CN | 104834222 A | 8/2015 |
| CN | 105120058 A | 12/2015 |
| CN | 105501121 A | 4/2016 |
| CN | 105527710 A | 4/2016 |
| CN | 105700372 A | 6/2016 |
| CN | 105881548 A | 8/2016 |
| CN | 106933369 A | 7/2017 |
| CN | 107517313 A | 12/2017 |
| JP | 1173297 A | 3/1999 |
| JP | 2016502721 A | 1/2016 |

(Continued)

OTHER PUBLICATIONS

Notice of Reasons for Refusal dated Nov. 13, 2019, received for corresponding Japanese Application No. 2018167825.

(Continued)

*Primary Examiner* — John J Lee
(74) *Attorney, Agent, or Firm* — Kinney & Lange, P.A.

(57) ABSTRACT

A method for waking up a voice interaction function based on a gesture includes: acquiring an image of a user's gesture; determining whether the acquired image matches a preset image; and waking up a voice interaction function in response to the acquired image matching the preset image.

10 Claims, 3 Drawing Sheets

(56) References Cited

FOREIGN PATENT DOCUMENTS

JP          2016052721 A     4/2016
JP          2017207891 A    11/2017

OTHER PUBLICATIONS

First Chinese Office Action dated Nov. 7, 2019, received for corresponding Chinese Application No. 201810061028.4, 15 pages.
Chinese Search Report dated Oct. 29, 2019, received for corresponding Chinese Application No. 201810061028.4, 4 pages.
Notice of Reasons for Refusal dated Apr. 24, 2020, received for corresponding Japanese Application No. 2018167825.
Second Chinese Office Action dated Jun. 10, 2020, received for corresponding Chinese Application No. 201810061028.4, 11 pages.
Chinese Search Report dated Jun. 2, 2020, received for corresponding Chinese Application No. 201810061028.4, 4 pages.

\* cited by examiner

METHOD, APPARATUS AND DEVICE FOR WAKING UP VOICE INTERACTION FUNCTION BASED ON GESTURE, AND COMPUTER READABLE MEDIUM

CROSS-REFERENCE TO RELATED APPLICATION

This application claims priority to Chinese Patent Application No. 201810061028.4, filed on Jan. 22, 2018, which is hereby incorporated by reference in its entirety.

TECHNICAL FIELD

The present disclosure relates to the technical field of waking up a voice interaction function, and in particular, to a method, apparatus and device for waking up a voice interaction function based on a gesture, and a computer readable medium.

BACKGROUND

With the improvement of voice recognition capability, voice recognition is applied to more and more intelligent devices. Currently, a voice interaction manner of an intelligent device is basically voice interaction based on a voice wakeup word. A specific operation manner of waking up a voice interaction function is usually to wake up a voice interaction device by using a fixed wakeup word, for example, Xiaoduxiaodu or Alexa. Then, the voice interaction device activates voice recognition, and performs voice interaction with a user.

However, in the existing manner of waking up a voice interaction function, the wakeup word needs to be said each time before voice interaction. Repeatedly saying the wakeup word leads to poor user experience.

SUMMARY

A method, apparatus and device for waking up a voice interaction function based on a gesture, and a computer readable medium are provide according to embodiments of the present disclosure, to resolve or alleviate the above technical problem in the existing technology.

According to a first aspect, a method for waking up a voice interaction function based on a gesture is provided according to an embodiment of the present disclosure, the method includes:

acquiring an image of a user's gesture;

determining whether the acquired image matches a preset image; and waking up a voice interaction function in a case that the acquired image matches the preset image.

With reference to the first aspect, in a first implementation of the first aspect of the present disclosure, the preset image is an image in which a finger is stretched out.

With reference to the first aspect, in a second implementation of the first aspect of the present disclosure, the preset image is an image in which fingers are snapped.

With reference to the first aspect, in a third implementation of the first aspect of the present disclosure, the method further includes:

acquiring a sound produced by the user's gesture; and determining whether the acquired sound matches a preset sound, where the waking up a voice interaction function in a case that the acquired image matches the preset image includes:

waking up the voice interaction function in a case that the acquired image matches the preset image and the acquired sound matches the preset sound.

With reference to the third implementation of the first aspect, in a fourth implementation of the first aspect of the present disclosure, the preset image is an image in which fingers are snapped and the preset sound is a sound of snapping fingers.

According to a second aspect, an apparatus for waking up a voice interaction function based on a gesture is provided according to an embodiment of the present disclosure, the apparatus includes:

an image acquisition module configured to acquire an image of a user's gesture;

an image determining module configured to determine whether the acquired image matches a preset image; and a wakeup module configured to wake up a voice interaction function in a case that the acquired image matches the preset image.

With reference to the second aspect, in a first implementation of the second aspect of the present disclosure, the preset image is an image in which a finger is stretched out.

With reference to the second aspect, in a second implementation of the second aspect of the present disclosure, the preset image is an image in which fingers are snapped.

With reference to the second aspect, in a third implementation of the second aspect of the present disclosure, the apparatus further includes:

a sound acquisition module configured to acquire a sound produced by the user's gesture; and a sound determining module configured to determine whether the acquired sound matches a preset sound, where the wakeup module is configured to wake up the voice interaction function in a case that the acquired image matches the preset image and the acquired sound matches the preset sound.

With reference to the third implementation of the second aspect, in a fourth implementation of the second aspect of the present disclosure, the preset image is an image in which fingers are snapped and the preset sound is a sound of snapping fingers.

Functions of the apparatus may be implemented by hardware, or by hardware executing corresponding software. The hardware or software includes one or more modules corresponding to the functions.

In a possible design, a structure of a device for waking up a voice interaction function based on a gesture includes a processor and a memory. The memory is configured to store a program used to support the device in performing the method in the first aspect, and the processor is configured to execute the program stored in the memory. The device may further include a communication interface for communication between the device and another device or a communication network.

According to a third aspect, a computer readable medium is provided according to an embodiment of the present disclosure, for storing a computer software instruction used by the device for waking up a voice interaction function based on a gesture, which includes a program for performing the method in the first aspect.

One or more of the foregoing technical solutions has the following advantage or beneficial effect: in the embodiments of the present disclosure, an intelligent voice interaction device can be woken up when no specific wakeup word needs to be said, so that voice interaction wakeup is more intelligent, thus facilitating interaction between the user and a voice device.

The foregoing descriptions are merely used for the purpose of this specification, but are not intended to constitute a limitation in any form. In addition to the exemplary aspects, implementations, and characteristics described above, the further aspects, implementations, and characteristics of the present disclosure will be easily understood with reference to the accompanying drawings and the following detailed descriptions.

BRIEF DESCRIPTION OF THE DRAWINGS

In the drawings, unless otherwise specified, the same reference signs in multiple drawings represent same or similar components or elements. The drawings may not be drawn to scale. It should be understood that the drawings describe only some embodiments disclosed according to the present disclosure, and should not be considered as a limitation to the scope of the present disclosure.

DETAILED DESCRIPTION

Only some exemplary embodiments are simply described in the following specification. A person skilled in the art may learn that the described embodiments may be modified in various manners without departing from the spirit or scope of the present disclosure. Therefore, the accompanying drawings and the descriptions essentially are considered to be exemplary rather than limitative.

The technical solutions are described by using the following embodiments.

Embodiment 1

Figure 1:
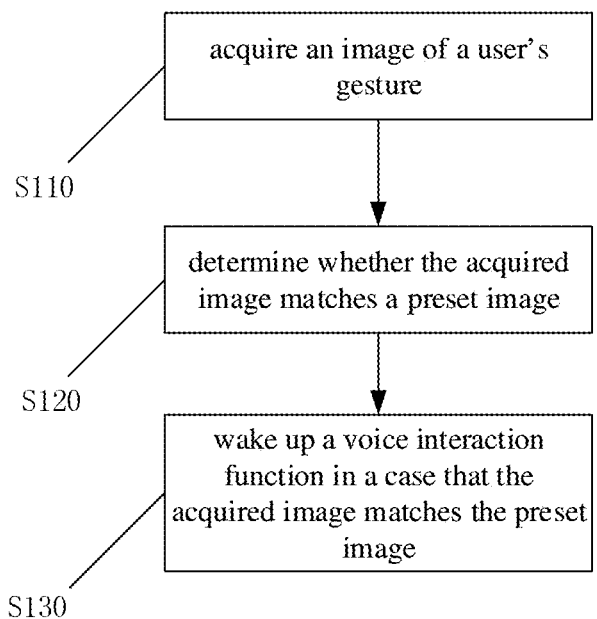
FIG. 1 is a flowchart of a method for waking up a voice interaction function based on a gesture according to Embodiment 1.

Referring to FIG. 1, FIG. 1 is a flowchart of a method for waking up a voice interaction function based on a gesture according to Embodiment 1 of the present disclosure. A method for waking up a voice interaction function based on a gesture is provided according to Embodiment 1, and the method includes the following steps S110-S130.

At S110, an image of a user's gesture is acquired.

When the user needs to activate a voice interaction function of an intelligent device, the user may make a particular gesture to a camera of the intelligent device, and the acquired image may be acquired in real time by using the camera. The intelligent device may be a smart phone including some well-known components, such as screen, microphone, chip and the like. In an example, the intelligent device itself or an APP running on it has a voice interaction function. The gesture image can be acquired by a camera provided on the intelligent device or be received by an antenna of the intelligent device.

At S120, it is determined whether the acquired image matches a preset image.

Figure 2:
FIG. 2 is a schematic diagram of a first preset image according to Embodiment 1.

The acquired image may be compared with the preset image, to determine whether the gesture image matches the preset image. It should be noted that in this embodiment, the matched gesture image does not need to be exactly the same as the preset image, as long as the user makes the same gesture. For example, as shown in FIG. 2, FIG. 2 is a schematic diagram of a first preset image in Embodiment 1. The preset image in Embodiment 1 may be an image in which a finger is stretched out. When the acquired gesture image is also an image in which a finger is stretched out, and the finger points to the location of the intelligent device, it may be determined that the acquired gesture image is consistent with the preset image.

Figure 3:
FIG. 3 is a schematic diagram of a second preset image according to Embodiment 1.

Likewise, the preset image may be adjusted to an image of another gesture to which the user gets used. As shown in FIG. 3, FIG. 3 is a schematic diagram of a second preset image in Embodiment 1. For example, the preset image may be set to an image in which fingers are snapped. Alternatively, multiple gesture images may be preset.

At S130, a voice interaction function is woken up in a case that the acquired image matches the preset image.

The voice interaction function is woken up correspondingly in a case that it is determined that the gesture image matches the preset image. The user may have a voice conversation with the intelligent device. In an example, when there are multiple preset images, the voice interaction function is woken up as long as the gesture image matches one of the preset images.

Embodiment 2

A difference from Embodiment 1 lies in that in Embodiment 2, comparison is performed not only for an image of the user's gesture but also for a sound produced by the user's gesture. A specific solution is as follows.

Figure 4:
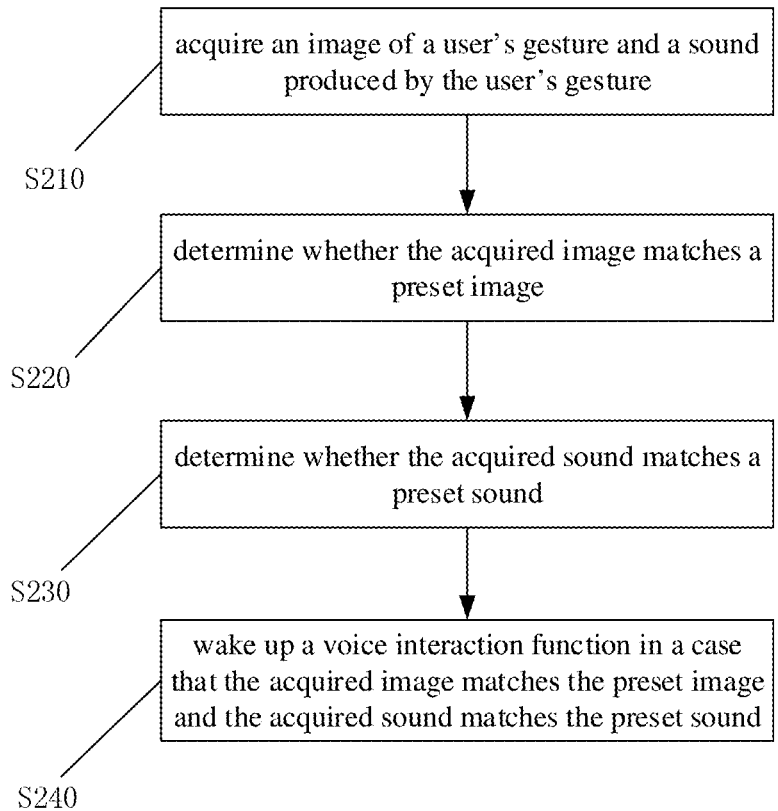
FIG. 4 is a flowchart of a method for waking up a voice interaction function based on a gesture according to Embodiment 2.

As shown in FIG. 4, FIG. 4 is a flowchart of a method for waking up a voice interaction function based on a gesture according to Embodiment 2. The method according to Embodiment 2 includes the following steps S210-S240.

At S210, an image of a user's gesture and a sound produced by the user's gesture are acquired.

When the user needs to activate a voice interaction function of an intelligent device, the user may make a particular gesture, and a corresponding sound is produced by the particular gesture. The intelligent device acquires both the gesture image and the produced sound. In Embodiment 2, the gesture made by the user may be snapping fingers, and the acquired sound is a sound of snapping fingers.

At S220, it is determined whether the acquired image matches a preset image.

The acquired gesture image may be compared with the preset image, to determine whether the gesture image matches the preset image. In this embodiment, the matched gesture image does not need to be exactly the same as the preset image, as long as the user makes the same gesture.

At S230, it is determined whether the acquired sound matches a preset sound.

In this step, determination of matching is further performed on the acquired sound. The acquired sound corresponds to the gesture image. For example, if the preset image is an image in which fingers are snapped, the preset sound is a sound of snapping fingers. The produced sound can be acquired by a microphone provided on the intelligent device or be received by an antenna of the intelligent device.

At S240, a voice interaction function is woken up in a case that the acquired image matches the preset image and the acquired sound matches the preset sound.

In Embodiment 2, a gesture in a different form may also be used. For example, a manner of clapping hands may be used.

Embodiment 3

Figure 5:
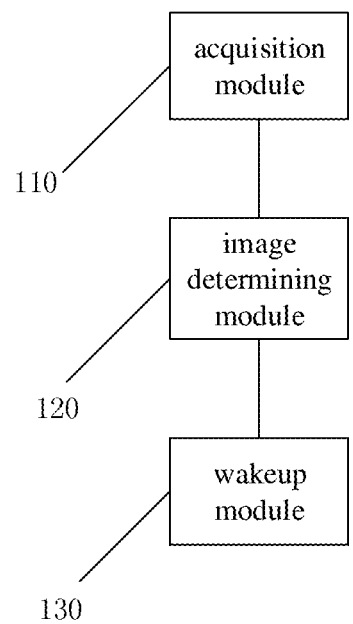
FIG. 5 is a connection block diagram of an apparatus for waking up a voice interaction function based on a gesture according to Embodiment 3.

Embodiment 3 corresponds to Embodiment 1, and an apparatus for waking up a voice interaction function based on a gesture is provided. Referring to FIG. 5, FIG. 5 is a connection block diagram of an apparatus for waking up a voice interaction function based on a gesture according to Embodiment 3.

The apparatus according to Embodiment 3 includes an acquisition module 110, an image determining module 120 and a wakeup module 130.

The acquisition module 110 is configured to acquire an image of a user's gesture;

The image determining module 120 is configured to determine whether the acquired image matches a preset image.

The preset image may be an image in which a finger is stretched out, or may be a gesture image in which fingers are snapped. Alternatively, multiple images may be preset, including, for example, both an image in which a finger is stretched out and an image in which fingers are snapped.

The wakeup module 130 is configured to wake up a voice interaction function in a case that the acquired image matches the preset image.

The principle of Embodiment 3 is the same as that of Embodiment 1, and details are not described herein again.

Embodiment 4

Embodiment 4 corresponds to Embodiment 2, and an apparatus for waking up a voice interaction function based on a gesture is provided. Details are as follows.

Figure 6:
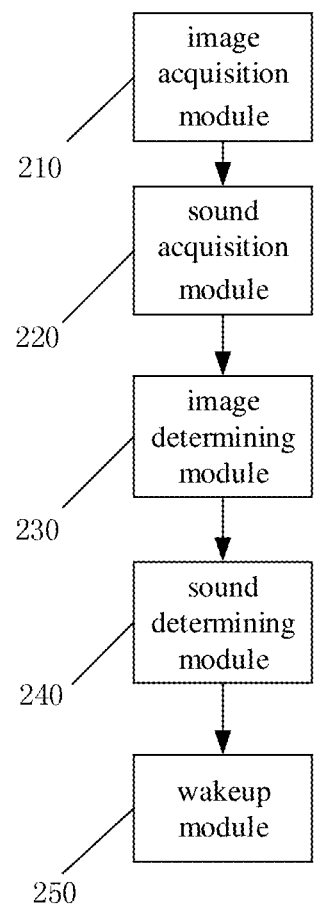
FIG. 6 is a connection block diagram of an apparatus for waking up a voice interaction function based on a gesture according to Embodiment 4.

As shown in FIG. 6, FIG. 6 is a connection block diagram of an apparatus for waking up a voice interaction function based on a gesture according to Embodiment 4. The apparatus provided according to Embodiment 4 of the present disclosure includes an image acquisition module 210, a sound acquisition module 220, an image determining module 230, a sound determining module 240 and a wakeup module 250.

The image acquisition module 210 is configured to acquire an image of a user's gesture.

The sound acquisition module 220 is configured to acquire a sound produced by the user's gesture.

The image determining module 230 is configured to determine whether the acquired image matches a preset image.

The sound determining module 240 is configured to determine whether the acquired sound matches a preset sound.

For example, a preset image may be an image in which fingers are snapped, and a preset sound may be a sound of snapping fingers.

The wakeup module 250 is configured to wake up a voice interaction function in a case that the acquired image matches the preset image and the acquired sound matches the preset sound.

The application manner and the principle of Embodiment 4 are the same as those of Embodiment 2, and details are not described herein again.

Embodiment 5

Figure 7:
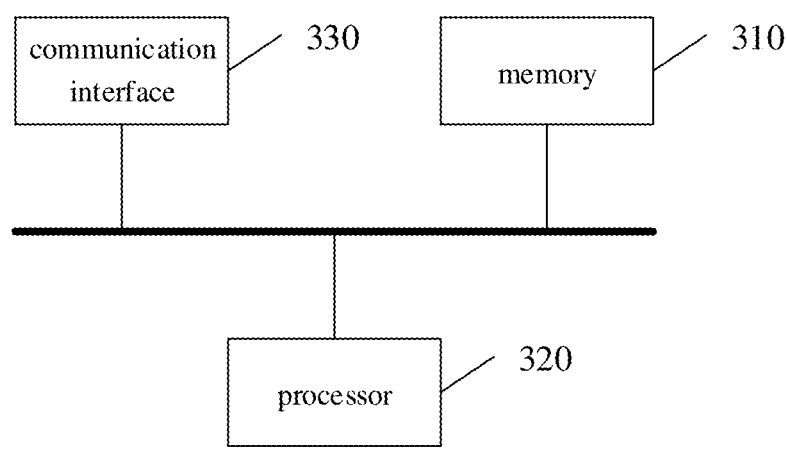
FIG. 7 is a connection block diagram of a device for waking up a voice interaction function based on a gesture according to Embodiment 5.

A device for waking up a voice interaction function based on a gesture is provided according to Embodiment 5 of the present disclosure. As shown in FIG. 7, the device includes a memory 310 and a processor 320. The memory 310 stores a computer program that can run on the processor 320. When the processor 320 executes the computer program, the method in any of the foregoing embodiments is implemented. The number of each of the memory 310 and the processor 320 may be one or more.

The device further includes:

a communication interface 330 configured to communicate with the outside, and perform data interaction and transmission.

The memory 310 may include a high speed RAM memory, or a non-volatile memory, for example, at least one magnetic memory.

If the memory 310, the processor 320, and the communication interface 330 are independently implemented, the memory 310, the processor 320, and the communication interface 330 may be connected and communicate with one another via a bus. The bus may be an Industry Standard Architecture (ISA) bus, a Peripheral Component Interconnect (PCI) bus, an Extended Industry Standard Architecture (EISA) bus, and so on. The bus may be divided into an address bus, a data bus, a control bus, and so on. For ease of description, in FIG. 7, only one bold line is used for representation, but it does not represent that there is only one bus or one type of bus.

Optionally, during specific implementation, if the memory 310, the processor 320, and the communication interface 330 are integrated into one chip, the memory 310, the processor 320, and the communication interface 330 may communicate with one another via internal interfaces.

In the descriptions of this specification, descriptions of a reference term such as "an embodiment", "some embodiments", "an example", "a specific example", or "some examples" are intended to mean that specific characteristics, structures, materials, or features described with reference to the embodiments or examples are included in at least one embodiment or example of the present disclosure. In addition, the described specific characteristics, structures, materials, or features may be combined in any one or more embodiments or examples in an appropriate manner. In addition, without contradiction, a person skilled in the art may combine different embodiments or examples and features of different embodiments or examples described in this specification.

In addition, terms such as "first" and "second" are merely used for description, but cannot be understood as indication or implication of relative importance or implication of a quantity of indicated technical features. Therefore, a feature defined with "first" and "second" may clearly or implicitly include at least one the feature. In the descriptions of the present disclosure, unless otherwise specified, "multiple" means at least two.

Any process or method description in the flowcharts or otherwise described herein may be understood as a module, segment or portion of code representing executable instructions including one or more steps for implementing a particular logical function or process. In addition, the scope of the preferred embodiments of the disclosure includes additional implementations, in which the functions may be performed in a substantially simultaneous manner or in an opposite order depending on the functions involved, not in the order shown or discussed, which should be understood by those skilled in the art to which the embodiments of the present disclosure are.

Logic and/or steps represented in the flowchart or otherwise described herein, for example, may be considered as a ordered list of executable instructions used to implement logic functions, and may be specifically implemented in any computer readable medium, for use by an instruction execution system, apparatus, or device (for example, a computer-based system, a system including a processor, or another system capable of obtaining and executing an instruction from the instruction execution system, apparatus, or device), or for use in conjunction with the instruction execution system, apparatus, or device. In terms of this specification, the "computer readable medium" may be any apparatus that can include, store, communicate, propagate, or transmit a program, for use by the instruction execution system, apparatus, or device, or for use in conjunction with the instruction execution system, apparatus, or device.

The computer readable medium in the embodiments of the present disclosure may be a computer readable signal medium, a computer readable storage medium, or any combination of the two. A more specific example of the computer readable storage medium at least (a non-exhausted list) includes the following: an electrical connection part (an electronic apparatus) having one or more wirings, a portable computer disk cartridge (a magnetic apparatus), a random access memory (RAM), a read only memory (ROM), an erasable programmable read only memory (EPROM or a flash memory), an optical apparatus, and a portable read only memory (CD-ROM). In addition, the computer readable storage medium may be a paper or another suitable medium on which the program can be printed. This is because optical scanning may be performed on the paper or another medium, edition, interpretation, or processing in another manner when necessary is performed to obtain the program in an electronic manner, and then, the program is stored in the computer memory.

In the embodiments of the present disclosure, the computer readable signal medium may include a data signal propagated in a baseband or propagated as a part of a carrier, which carries computer readable program code. The propagated data signal may use multiple forms, and includes, but is not limited to, an electromagnetic signal, an optical signal, or any suitable combination thereof. The computer readable signal medium may also be any computer readable medium other than the computer readable storage medium. The computer readable medium may send, propagate, or transmit a program for use by the instruction execution system, an input method, or a device or for use in conjunction with the instruction execution system, the input method, or the device. The program code embodied on the computer readable medium may be transmitted by using any appropriate medium, including, but not limited to, radio, wire, optical fiber, radio frequency (Radio Frequency, RF), or any suitable combination thereof.

It should be understood that the parts of the present disclosure may be implemented by hardware, software, firmware, or a combination thereof. In the foregoing implementations, the multiple steps or methods may be implemented by software or firmware stored in the memory and executed by an appropriate instruction execution system. For example, if the steps or methods are implemented by hardware, as in another implementation, the steps or methods may be implemented by using any one or a combination of the following technologies commonly known in the art: a discrete logic circuit having a logic gate circuit configured to implement a logic function for the data signal, an application-specific integrated circuit having an appropriate integrated logic gate circuit, a programmable gate array (PGA), a field-programmable gate array (FPGA), and the like.

A person of ordinary skill in the art may understand that all or some of steps in the methods in the foregoing embodiments may be implemented by using a program instructing related hardware. The program may be stored in a computer readable storage medium, and when the program is executed, one or a combination of the steps in the method embodiment is included.

In addition, functional units in the embodiments of the present disclosure may be integrated into one processing module, or each of the units may exist alone physically, or two or more units are integrated into one module. The integrated module may be implemented in a form of hardware, or may be implemented in a form of a software functional module. When the integrated module is implemented in the form of a software function module and sold or used as an independent product, the integrated module may be stored in a computer readable storage medium. The storage medium may be a read only memory, a magnetic disk, an optical disc, or the like.

To sum up, in embodiments of the present disclosure, an intelligent voice interaction device can be woken up when no specific wakeup word needs to be said, such that wakeup is more intelligent, thus facilitating interaction between the user and a voice device.

The foregoing descriptions are merely specific implementations of the present disclosure, but are not intended to limit the protection scope of the present disclosure. Any variation or replacement readily figure out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for waking up a voice interaction function based on a gesture, comprising:
    acquiring an image of a user's gesture;
    determining whether the acquired image matches a preset image;
    acquiring a sound produced by the user's gesture;
    determining whether the acquired sound matches a preset sound; and
    waking up a voice interaction function in response to the acquired image matching the preset image and the acquired sound matching the preset sound.

2. The method according to claim 1, wherein the preset image is an image in which a finger is stretched out.

3. The method according to claim 1, wherein the preset image is an image in which fingers are snapped.

4. The method according to claim 1, wherein the preset image is an image in which fingers are snapped, and the preset sound is a sound of snapping fingers.

5. A device for waking up a voice interaction function based on a gesture, comprising:
    one or more processors; and
    a storage apparatus configured to store one or more programs,
    wherein the one or more programs are executed by the one or more processors to enable the one or more processors to implement the method according to claim 1.

6. A non-transitory computer readable medium, in which a computer program is stored, wherein the program is executed by a processor to implement the method according to claim 1.

7. An apparatus for waking up a voice interaction function based on a gesture, comprising:
- an image acquisition module configured to acquire an image of a user's gesture;
- an image determining module configured to determine whether the acquired image matches a preset image;
- a sound acquisition module configured to acquire a sound produced by the user's gesture;
- a sound determining module configured to determine whether the acquired sound matches a preset sound; and
- a wakeup module configured to wake up a voice interaction function in response to the acquired image matching the preset image and the acquired sound matching the preset sound.

8. The apparatus according to claim 7, wherein the preset image is an image in which a finger is stretched out.

9. The apparatus according to claim 7, wherein the preset image is an image in which fingers are snapped.

10. The apparatus according to claim 7, wherein the preset image is an image in which fingers are snapped, and the preset sound is a sound of snapping fingers.

\* \* \* \* \*